July 17, 1956     B. E. ENSSLE     2,754,795
MACHINE FOR SPRAYING OBJECTS OF IRREGULAR OUTLINE
Filed March 28, 1955     7 Sheets-Sheet 1

Fig. 1.

INVENTOR.
Bruno E. Enssle
-BY-
Attorney

July 17, 1956

B. E. ENSSLE 2,754,795

MACHINE FOR SPRAYING OBJECTS OF IRREGULAR OUTLINE

Filed March 28, 1955

INVENTOR.
Bruno E. Enssle
BY-
Attorney

July 17, 1956  B. E. ENSSLE  2,754,795
MACHINE FOR SPRAYING OBJECTS OF IRREGULAR OUTLINE
Filed March 28, 1955

INVENTOR.
Bruno E. Enssle

July 17, 1956  B. E. ENSSLE  2,754,795
MACHINE FOR SPRAYING OBJECTS OF IRREGULAR OUTLINE
Filed March 28, 1955  7 Sheets-Sheet 4

*Fig. 5.*

INVENTOR.
Bruno E. Enssle
-BY-
Attorney

July 17, 1956    B. E. ENSSLE    2,754,795
MACHINE FOR SPRAYING OBJECTS OF IRREGULAR OUTLINE
Filed March 28, 1955    7 Sheets-Sheet 5

INVENTOR.
Bruno E. Enssle
BY
Glenn B. Morse
Attorney

United States Patent Office 2,754,795
Patented July 17, 1956

2,754,795

MACHINE FOR SPRAYING OBJECTS OF IRREGULAR OUTLINE

Bruno Eugen Enssle, Grand Haven, Mich.

Application March 28, 1955, Serial No. 497,265

10 Claims. (Cl. 118—2)

This invention relates to the control of automatic conveyorized spraying operations. The preferred forms of the invention have been developed primarily in connection with the spraying of coating materials on hides and irregular pieces of leather. The use of automatic spraying equipment for this type of operation is not new. Conventional equipment is available which is based upon a conveyor straddled by a spray booth station. A loading station is ordinarily provided at the "upper" end of the conveyor, with the articles to be sprayed carried at a uniform rate into and through the spray station. Reciprocating or rotative spray-gun carriers maintain a continuous movement of the spray guns along a pre-established path usually above the conveyor, with the guns directed at the conveying surface.

When a spraying operation of this type is devoted to the application of spray material on a continuous strip, the machine can be arranged so that it approaches operation at practically one hundred per cent efficiency, as far as the deposit of the finishing material on the strip is concerned. A full one hundred per cent cannot be realized, of course, as a result of the removal of spray vapor from the booth by the conventional ventilating blower system associated with spray booth installations. When automatic spraying operations are applied to the processing of articles of irregular outline, however, a problem arises which is not present in the case of the continuous strip. The operation of the spray guns on a continuous basis inevitably results in throwing a considerable quantity of spray on the area of the conveyor which is not covered by the articles. The spray material wasted in this manner represents a very substantial investment. It will also be obvious that the projection of such a quantity of spray materials on the conveyor surface itself will result in the loading up of the conveyor components with spray material in all stages of drying to such an extent that the surface of the conveyor becomes distorted and sticky, and the interference with the driving mechanism of the conveyor becomes very substantial.

Attempts have been made previously to control the operation of the spray guns or other applicators as a function of the presence or absence of portions of the sprayed articles directly underneath the path of the guns. A fixed detection system controlling the application of material to the articles at a point directly above the detecting member is shown in Patent Number 441,991. Recognizing the desirability of removing the detecting system from the space within the spray booth, in order to avoid accumulation of spray material on the detection mechanism, an arrangement has also been developed in which a detector (usually in the form of an electric eye) has been secured to a member which moves with or as a function of the movement of the spray gun carrier. The signals established by the detector have then been applied to a moving strip of tape in the form of perforations, with the perforations later operating to energize the system controlling the off-on condition of the spray guns. The rate of movement of the tape is associated with the movement of the conveyor, and the space along the path of movement of the tape is associated with the distance from the detecting to the spraying station with the result that the spray gun is turned on at a point a given time interval from the point where the detector established its signal. A device of this type is discussed in Patent Number 2,565,655.

The control system provided by this invention is of the general type in which the pattern of signals corresponding to the contour of the sprayed article are established by a detector system ahead of the spraying station. The invention provides for a continuous eraseable recording of signals corresponding to the width and position of the article along a given path on the conveyor. These signals are established by a system including a group of fixed-position feelers. The recording system also includes a brush and contact group in which the brush is driven as a function of the movement of the spray gun carrier, and each of the contacts is associated with one of the detector members, or "feelers." The sweep of the contact arm or brush across the contacts places each of the detectors momentarily in a circuit which is capable of causing a signal to be applied to the tape. Magnetic recording procedures are utilized to apply the signal to the tape, the tape being moved at a pre-determined linear velocity with respect to the conveyor movement to a position where a "pick-off" head is mounted. At this point, a spray-gun control system is energized by the recorded signals. Under ordinary circumstances, it is most practical to maintain a constant velocity of the movement of the carrier mechanism which supports the spray guns. In order to compensate for the variation of the conveyor speed with respect to the constant velocity of spray-gun movement to suit variable operating conditions, it becomes desirable to move the position of the pick-off point with respect to the point of recording along the tape. Such variation of position corresponds to a variation of delay in time between the point of the recording of the signals and the time in which the spray gun units are energized, and is necessary (even with a constant tape-conveyor velocity ratio) in order to preserve the phase relationship of the spray gun action with the recorded signals. It might also be noted in passing that a certain degree of time delay is inherently present between the instant at which the recorded signal enters the pick-off head and the instant that the spray is deposited on the surface of the conveyor. Such a time delay is due not only to the electric and electronic circuits and the mechanism involved (which to some degree may be compensated for within that part of the system), but also involves the period required for the operation of the solenoid valves, for the surge of pressure to move along the compressed air lines controlling the spray guns, for the transit of the spray from the guns themselves down to the conveyor. These and similar factors are all grouped together to form an overall time delay which is more or less constant for a given installation. Variation of conveyor speed with respect to this constant will necessitate some degree of adjustment so that the spray may be landed at the desired point. Ordinarily, the amount of compensation required for this variable is very small.

The use of a group of fixed detectors adds another factor which must be considered, and which has an effect related to the matter of time delay. Theoretically, the group of fixed detectors would result in a series of intermittent spray discharges rather than a relatively continuous sweep across the surface of the articles being sprayed. It is not only desirable that the equipment be provided with a certain amount of "lead" so that the signal controlling the spray guns will result in the delivery of the spray at the edge of the article being sprayed, but that a certain amount of hold-over be included so that the spray will continue for a period representing the distance between the points where the detectors are mounted. This arrangement inevitably results in a slight loss at the opposite edge of the sprayed article as the machine moves slightly beyond the edge of the sprayed article, but such loss is inconsequential in view of the economies in over-all operation which are offered by this type of equipment.

Conventional design for automatic spraying equipment involves the use of a plurality of spray heads, each of which operates along its own path of movement in the spray booth. Correspondingly, it is preferable to provide a similar number of groups of detecting elements, such that each group will control the operation of a spray gun along a particular path of movement. To facilitate the adjustment of the machine to variations of conveyor speed, applicant has found it desirable to collect the pick-off heads associated with the various spray gun paths into one unit which is movably mounted for adjustment of position along the length of the tape. With this arrangement, preferably adjustable with a screw mechanism, adjustment can be readily made without the necessity of a considerable amount of overhaul. The mounting of the pick-off heads for such adjustment rather than the recording heads reduces the time required to make the adjustment, since it is not necessary to wait for the passage of sprayed articles down from the recording to the spraying station in order to test each adjustment. With the adjustable mounting of the pick-off units, the adjustment can be made during the passage of one particular article underneath the spray heads. It should also be noted in passing that the velocity of movement of the tape may either be established as a function of the velocity of movement of the conveyor, or the tape may be separately operated at a constant predetermined speed. In the latter arrangement, special provision should be made in cases where signals are recorded at more than one position along the tape for pick-off at a single point. To be strictly accurate, it would not be possible to adjust the position of the pick-off point with respect to one of the recording points to obtain a certain velocity ratio, and at the same time maintain the same change of velocity ratio with respect to the other recording point. For changes of substantial amount, the position of the recording and pick-off points should always be maintained at the same ratio of distance with respect to each other.

In summary, the arrangement provided by this invention includes the following general sub-systems of electric, electronic, and mechanical equipment:

(a) A conveyor moving at a predetermined velocity.

(b) A moving spray gun carrier, ordinarily operating within a spray booth, in which the velocity of the carrier movement is also predetermined.

(c) Recording equipment which imposes on a moving tape signals established by the detectors, the tape being transmitted at a predetermined velocity to a pick-off point (and preferably in continuous movement along a path returning to the recording position, after passing an erasing station).

(d) A gun-control mechanism operating as a function of the presence or absence of a signal on the tape at the pick-off station.

The result of the operation of the gun-controlled mechanism is to energize the guns at a certain time after the application of the recording signal, which corresponds to the length of the tape which has passed from the recording head to the pick-off head. It is important that the spray-gun carrier should at that instant be in the same position that it was when the recording of the signal was completed, and it is therefore necessary to establish and maintain a relationship between the transverse velocity of the spray gun carrier and the velocity of a conveyor.

The several features of this invention will be analyzed in detail through a discussion of the particular embodiments illustrated in the accompanying drawings. In the drawings.

Referring particularly to Figures 1 through 4, the first modification of this invention is shown incorporated in a conventional reciprocating spraying machine based upon a conveyor system which includes a main conveyor belt 20 of link or mesh construction, and supported at the "upper" end by the roller 21. This roller is carried by suitable bearing blocks 22 supported by the rails 23 and 24, and is positioned along the rails by the action of the screw 25 to establish the necessary tension in the belt 20. The rails 23 and 24 are supported by leg structure as indicated at 26 and 27, this arrangement being duplicated at opposite ends of the roller 21. At the lower end of the conveyor (illustrated in Figure 4), a roller 28 is mounted on framework of the conveyor generally indicated at 29 and which is supported by suitable leg structure as indicated at 30. Driving power for the main conveyor is provided by the motor-speed reducer unit 31 which transfers torque to the roller 28 through the belt or chain 32.

In addition to the end rollers 21 and 28, the belt 20 is positioned by a convenient group of idler rollers 33, 34, 35, and 36. The idlers are used primarily to maintain a desirable path of return movement for the belt 20 to avoid the structure of the frame 29, which forms no part of this invention, and will therefore not be further described in detail. In addition to the main conveyor centering around the belt 29, an auxiliary conveyor unit is provided as a part of the over-all conveyor system, and which includes a series of laterally-spaced flexible bands 37 positioned by the rollers 38 and 39 mounted in an extension of the framework of the main conveyor including the outer leg units 40.

At an intermediate position along the conveyor system, a spray booth structure 41 is provided as a housing for the spray gun and carrier system which delivers spray material downwardly toward the surface of the belt 20. Suitable vertical columns 42 and 43 support the beam 44 at a position above and transverse with respect to the movement of the conveying surface of the belt 29. The U bolts 45 and 45a are provided as a convenient means for securing the beam 44 to the columns 42 and 43. The beam 44 supports the mechanism associated with the reciprocating carriage generally indicated at 46. Guide rails 47 and 48 are provided at the top and bottom respectively of the beam 44, and suitably-formed blocks or rollers 49, 50, 51, and 52 are mounted on the frame member 53 of the carriage for engagement with the rails 47 and 48. The vertical rods 54 and 55 (refer to Figure 3) support a lower member 56, which, in turn, supports the rod 57 on which the spray gun units 58, 59, and 60 are mounted. The fluid conduit 61 distributes spray material to the guns 58

Figure 3:
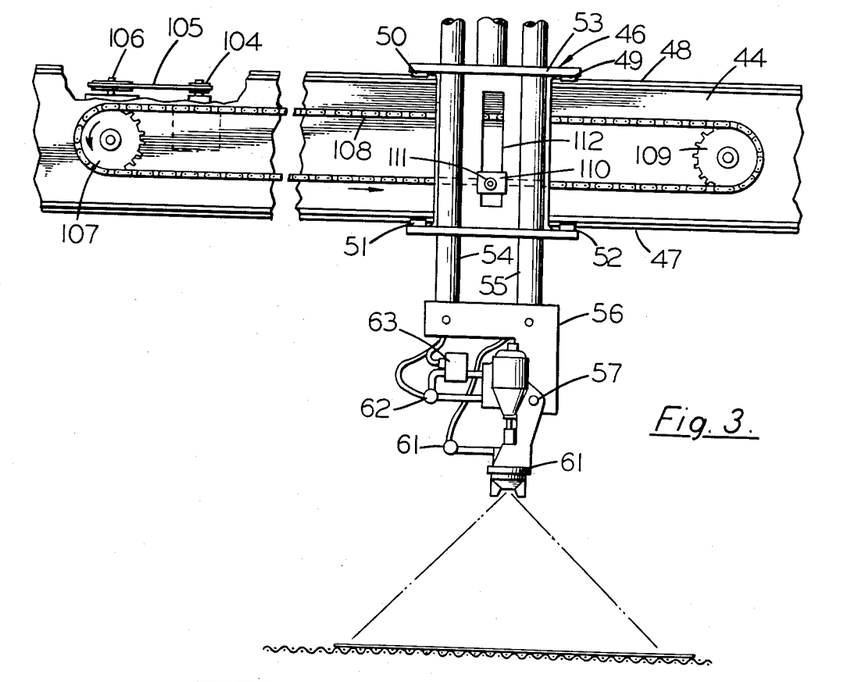
Figure 3 is a section taken on a plane transverse with respect to the conveyor, and illustrating the spray gun carrier mechanism, on an enlarged scale.
Figure 4:
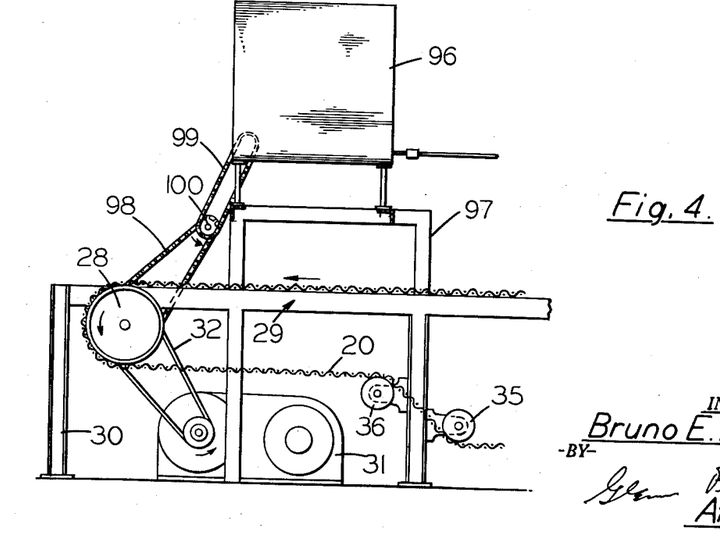
Figure 4 is a section taken on the plane 4—4 of Figure 1.

59, and 60, and the air conduit 62 provides a source of air under pressure, which is controlled with respect to each gun by a solenoid-operated valve 63 (refer to Figure 3). Suitable air and fluid hoses 64 and 65, respectively, extend from the distributing conduits 61 and 62 upwardly through the transverse opening 66 in the structure of the spray booth 41.

A vertical post 67 is mounted upon the frame 53 of the carrier, and is engaged by a bearing 68 for free rotation with respect thereto. The bearing 68 is firmly secured to the arm 69, which is slideably received in the sleeve 70 rotatably mounted upon the depending post 71 attached to the surrounding building structure. The function of the post 71 and the beam 69 is to provide a means for leading the air and fluid conduits 64 and 65 to a convenient junction point, and for carrying the several wires associated with the electrical circuit to be described hereinafter. The platform 72 is mounted at the lower extremity of the depending post 71 for the support of the several junction boxes and terminals which are conveniently used as connecting points with the other elements of the machine. As the carriage 46 and its associated structure is moved in a reciprocating fashion back and forth along the rails 47 and 48, the bearing 68 moves within a sector about the post 71, accompanied by a limited sliding movement of the arm 69 with respect to the sleeve 70.

The rods 54 and 55 of the carriage 46 are extended upwardly through the opening 66 in the spray booth to provide support for the contact arm 73. The structure of the contact arm 73 may be considered as including a base portion 74 fixed with respect to the rods 54 and 55 by being secured to a block 75 which engages these rods, and is fixed with respect thereto by suitable set screws 76. Bolts shown at 75a and 75b secure the arm to the block 75. The outer extremity of the arm 73 is provided with the resilient contact brush members 77, 78, and 79. During the reciprocating movement of the carrier 46, the association of the arm 73 with the carrier causes the brush members 77, 78, and 79 to sweep back and forth across their respective rows of contacts 80, 81 and 82.

Figure 1:
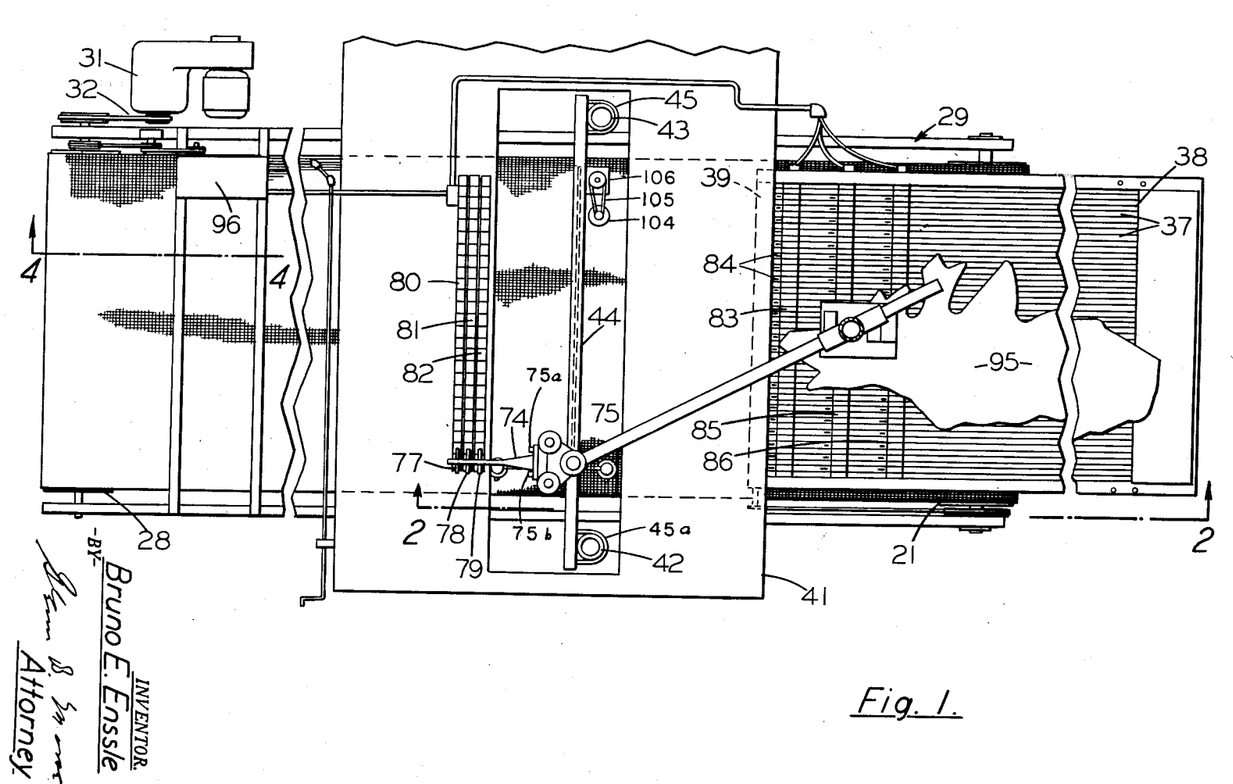
Figure 1 presents a plan view of a reciprocating automatic spraying machine embodying principles of this invention.
Figure 2:
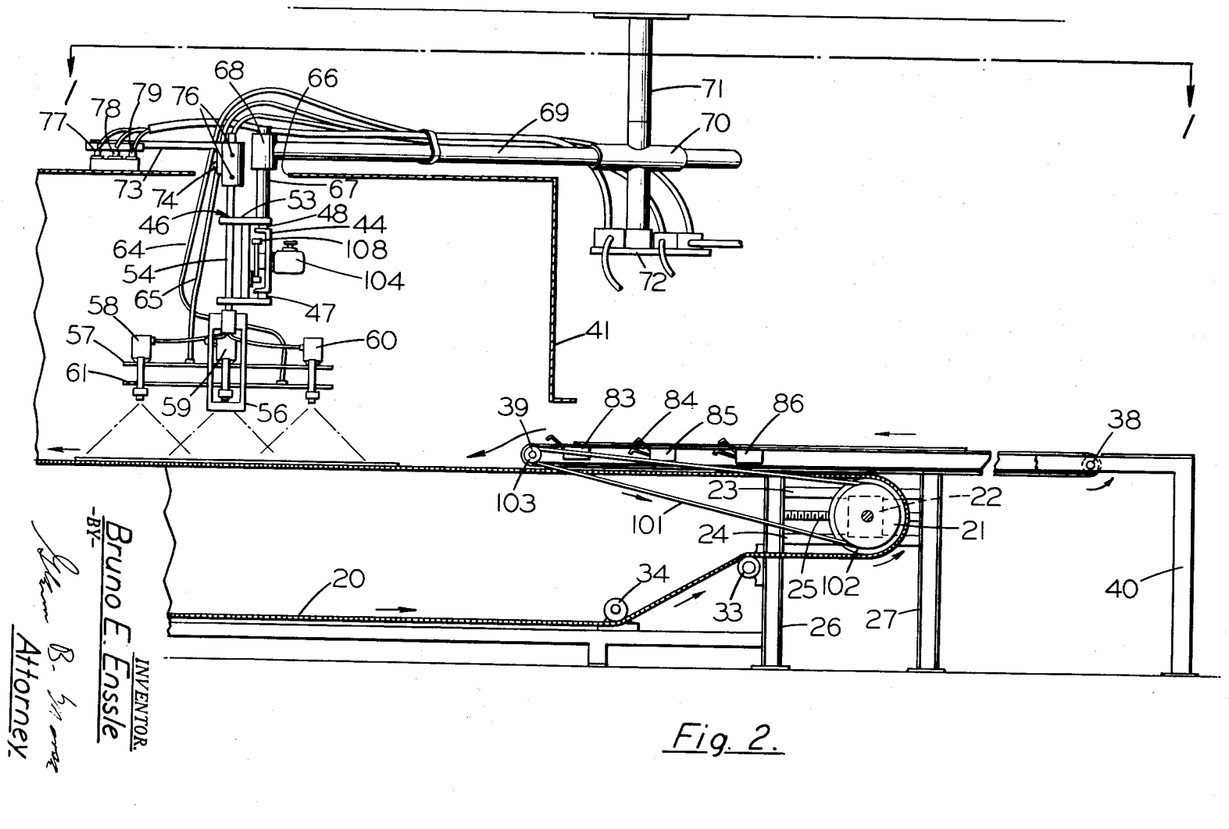
Figure 2 presents a sectional elevation taken on the plane 2—2 of Figure 1, on an enlarged scale.
Figures 6, 9:
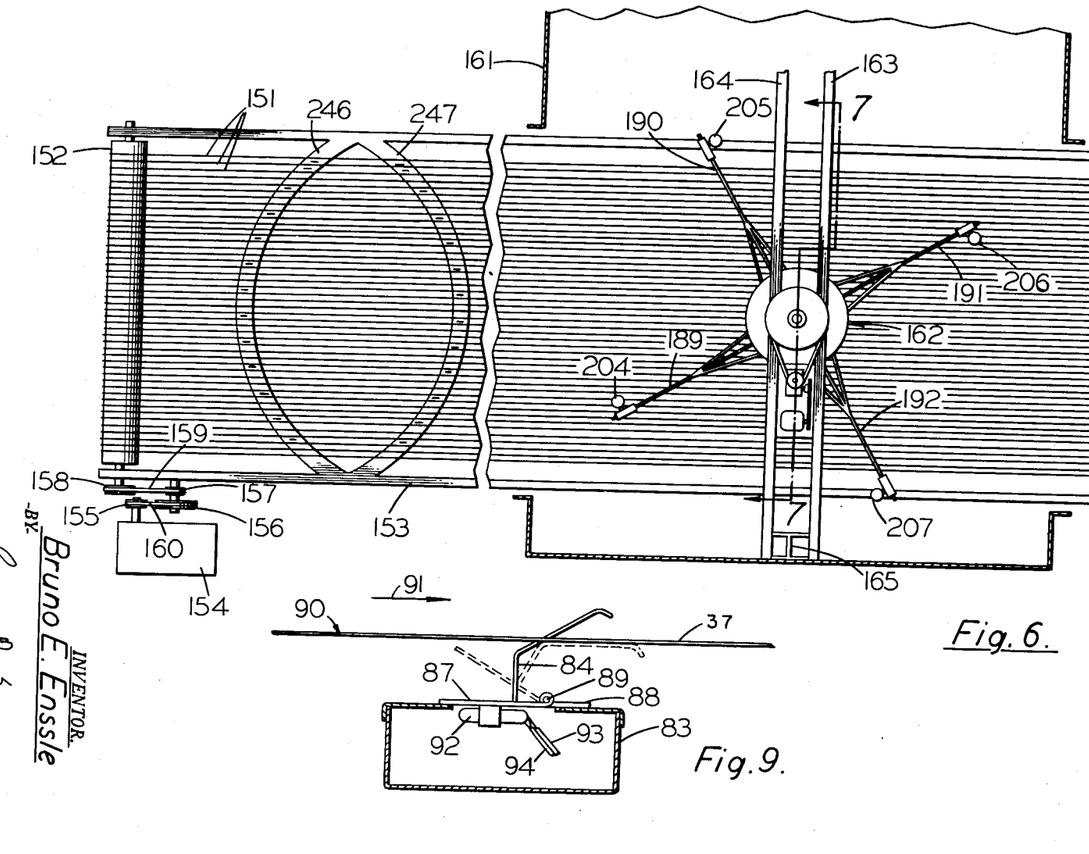
Figure 6 is a plan view of a modified form of the invention incorporated in a rotary spraying machine.
Figure 9 presents an enlarged section of the details of the detecting members preferably utilized with both modifications of the invention described herein.

The preferred mechanism for detecting the contour of the hides carried by the conveyor system in Figure 1 centers around the mechanism illustrated in Figure 9. A hollow beam 83 is mounted in fixed relationship with the frame 29 of the conveyor system, and provides for the support of the detector members and acts as a conduit for the group of wires which are associated therewith. A series of feeler members 84 extends upwardly between the bands 37 forming the auxiliary conveyor, with the upper end of the feeler members normally intersecting the plane of the conveying surface. A considerable number of such feeler members 84 are provided, and may be spaced as closely together as may be desired, the closer spacing providing a more responsive indication of small changes in the outline of the hides as they move along the conveyor system. The group of detector members 84 forming the single line of detectors carried by the beam 83 correspond to the path of movement of the spray gun 58, and may be considered as associated with that path of movement. Similarly, the row of detectors carried by the beam 85 are associated with the path of movement of the spray gun 59, and the detectors carried by the beam 86 are associated with the path of movement of the spray gun 60. Each of the beams, and its associated detectors and other structural details are similar in all respects.

The feeler members 84 are each mounted upon a member 87 which is hinged to the leaf 88 mounted firmly on the beam 83. The pin 89 establishes the axis of rotation of the detector 84, and movement of leather along the conveyor surface indicated at 90 in Figure 9 in the direction of the arrow 91 will induce rotation of the detector 84 from the full line position to that indicated in dotted lines, accompanied by the similar rotation of the member 87. Such rotation of the member 87 carries with it the mercury switch 92, and movement to the dotted line position serves to close a normally open circuit at this point. Wires 93 and 94 are associated with each of the mercury switches 92, and are collected within the structure of the beam 83 and carried outwardly to points of connection with the remainder of the control and recording circuit.

The establishment of a signal which will later be used to control an off-on condition of the sprayers through the energization of the solenoid valves 63 is initially established through the closing of a series circuit between one of the mercury switches 92 and the associated contact within the row of contacts 80, 81, and 82. One contact is provided in each of the rows for each of the mercury switches 92 in the associated group of detectors. As the edge of the hide 95 moves along the conveyor and is intercepted by one of the feeler or detecting members 84, no significant occurrence takes place until the contact arm 73 carries its associated brush member into engagement with the particular contact associated with that detector member. At that moment, the closure of the circuit will cause the electronic components of the machine to impress a recorded signal upon a moving strip of tape. As far as the actual recording process is concerned, the recording system is conventional, and is based upon the magnetic action of a suitable recording head with a strip of tape having the capability of permanently maintaining magnetic flux patterns which are established by a suitable recording head, until these patterns are erased.

The electronic components of the mechanism may be conveniently mounted within a housing 96 mounted on a frame 97 which may be considered as fixed with respect to the frame 29 of the conveyor system. Movement of an endless record tape within the housing 96 is accomplished in the modification of the invention illustrated in Figures 1, 2, 3, 4, and 5 by a power-take-off from the conveyor system which includes the chains or belts 98 and 99, and the idler assembly 100.

The electronic components associated with the moving tape include provision for the generation of a recordable signal, the amplification of it to desirable recording amplitude, the "pick-off" of the recording signal at a point located at a predetermined distance along the tape, the amplification of the signal taken from the tape, and the application of the amplified signal to the control of the off-on relationship of the spray guns. With the tape moving at a predetermined relationship with respect to the movement of the conveyor system, the net result of the operation of the system will be the "firing" of a spray gun at a given distance "down" along the conveyor from the point where a detector member maintained a closed circuit at the moment in which the contact arm swept across the contact associated with that detector member. It is of course necessary that the spray gun receiving that signal should be at the identical transverse position (with respect to the conveyor) of the detector member at the moment of firing. To accomplish this, it is necessary to maintain a definite velocity ratio between the transverse movement of the carrier 46 and the movement of the conveyor. For these purposes, the auxiliary conveyor which traverses the area of the detector members may be considered as a part of the movement of the principal conveyor, due to the driving of the auxiliary conveyor by the belt or chain 101 by a suitable pulley 102 which rotates with the main conveyor roller 21. The pulley 103 drives the roller 39 of the auxiliary conveyor, so the entire conveyor system may be regarded as having a predetermined velocity characteristic with respect to the movement of the tape, which is also driven by a power take-off from the main conveyor at a predetermined velocity ratio.

To maintain a predictable movement of the carrier 46, a driving system for maintaining uniform reciprocating movement is mounted on the beam 44, and includes a motor 104, a belt or chain 105, and a speed reducer 106. The speed reducer, in turn, drives a sprocket 107 and maintains uniform, or at least predictable, movement of the continuous chain 108. The idler sprocket 109, rotatably mounted on a shaft on an axis fixed with respect to the beam 44, maintains a path of travel of the chain 108. The chain 108 carries a cross head 110 on a pin 111 which is fixed with respect to the chain 108. Continuous movement of the chain under a constant direction of rotation of the driving sprocket 107 causes the pin to move along one portion of the chain 108 between the sprockets 107 and 109, around one of the sprockets, and return along the opposite portion of the chain. Such movement results in the sliding engagement of the crosshead 110 within the slot 112 in the frame 53 of the spray gun carrier. On the assumption of a constant speed of rotation of the motor 104, the cycle of movement of the spray gun carrier can be treated as having a pre-established relationship with the velocity of the conveyor.

Figure 5:
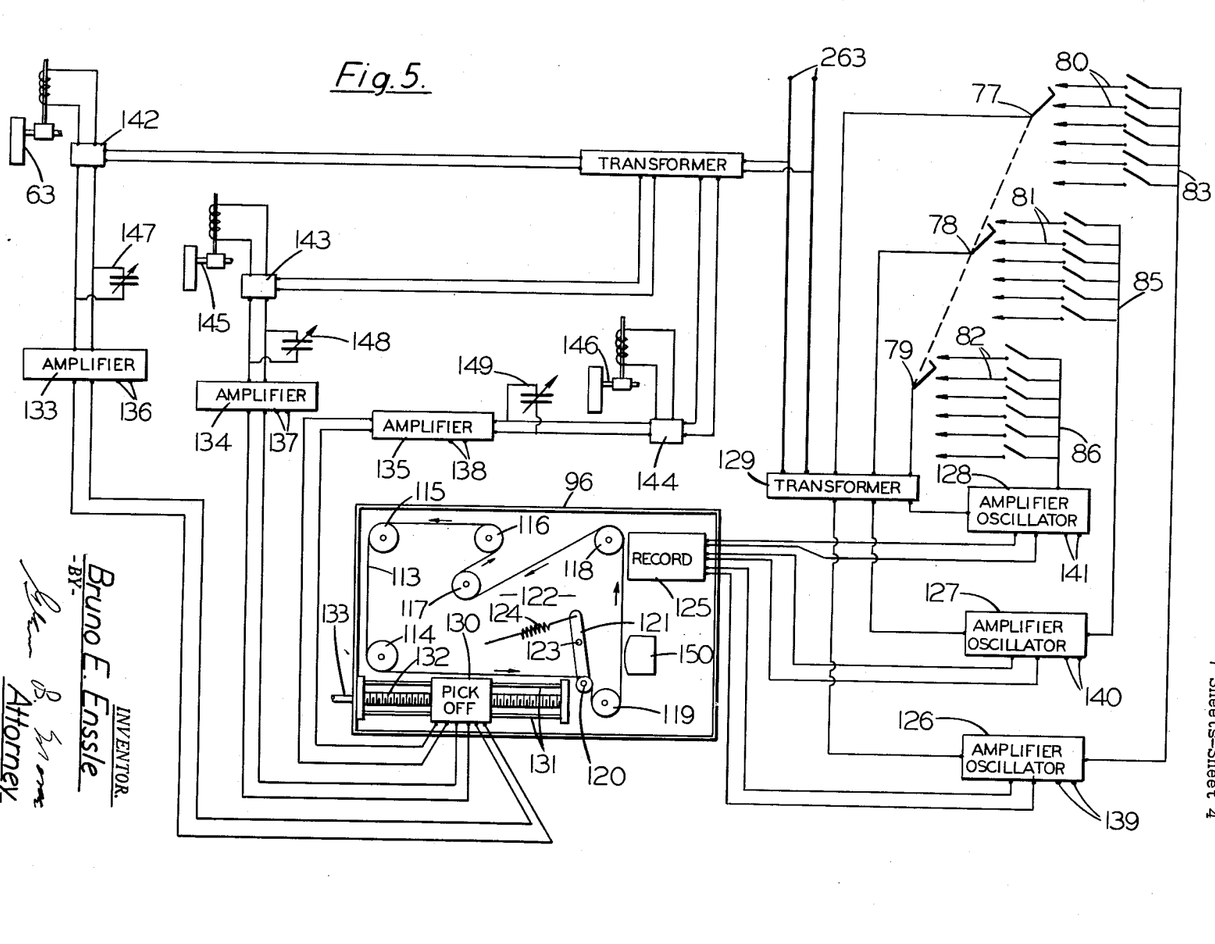
Figure 5 is a schematic diagram illustrating the electrical circuit involved in the modification of this invention presented in Figures 1 through 4, inclusive.

The operation of the electronic circuit which provides for the application and utilization of the signals on the tape is best illustrated in the schematic diagram shown in Figure 5. A continuous tape 113 is positioned by the rollers 114, 115, 116, 117, 118, 119, and a tension-regulating device including the roller 120 mounted on the arm 121 pivotally mounted on the base plate 122 on the pin 123. A spring 124 continuously urges the arm 121 above the pin 123 to establish the desired tension on the tape 113. If desired, an auxiliary roller may be provided in bearing engagement against the tape at the driving roller 119 to render more positive the frictional engagement of the tape with the roller for avoiding slippage. The groups of detector-mercury switch assemblies associated respectively with the beams 83, 85, and 86 are respectively indicated at the upper right in the schematic diagram shown in Figure 5. The brush members 77, 78, and 79 associated with the rows of contacts 80, 81 and 82 are also indicated in their circuit relationship. The closure of one of the mercury switches in, for example, the group mounted on the beam 83, will result in the completion of a circuit through that switch at the time when the contact brush 77 establishes contact with the particular contact member associated with that mercury switch. At that moment a circuit will be completed to the amplifier-oscillator, which will result in impressing a recorded signal upon the tape 113. It will be noted that there are three sets of amplifiers leading into the recording head, and each one of these is devoted to the combination of a particular group of detectors with a particular corresponding group of contacts. The recording head 125 is actually a group of three recording heads spaced side by side with respect to the movement of the tape, resulting in the recording of three different paths of signals. The amplifier 126 is associated with the system of circuits including the brush 77, the contact row 80, and the detectors mounted on beam 83. Correspondingly, the amplifier 127 is associated with the brush 78, the row of contact 81, and the detectors associated with the beam 85. The amplifier 128 is similarly associated with the brush 79, the row of contacts 82, and the detectors of beam 86. The transformer 129 is provided with suitable taps for the supply of power to each of these systems, each of them having a segment of the triple recording head 125 associated therewith.

After a particular point on the tape has passed the recording head 125, a predetermined length of tape is established which will create the necessary time delay to bring about the firing of the spray gun at the point on a hide which caused detection. After such a length of tape has been established (consideration having been given to the velocity ratio between the conveyor and the tape) the pick-off head 130 is located as desired to accomplish this result. The selection of the position of the pick-off head 130 is facilitated through the mounting of that pick-off head on a track system 131, with the positioning of the pick-off head along the track being accomplished through the action of the screw 132. A suitable threaded block (not shown) is secured to the pick-off head 32, and engages the screw 132. Rotation of the shaft 133 induces corresponding rotation of the screw 132, resulting in the positioning of the pick-off head as desired. Preferably, the shaft 133 extends from the housing 96 to a point near enough to the spray booth for the operator to determine the effect of the adjustment being made. With the pick-off head being mounted in this fashion (the pick-off head actually being in three different segments corresponding to the three paths of signal recorded by the recording head) it is possible for the operator to adjust the machine during the passage of a single hide, without waiting for the lapse of time involved in movement of the hide from the detecting position down to the spray position, as would be the case if the recording heads were subject to adjustment.

The arrival of a recorded signal at the pick-off head associated with that particular path of signal results in the energizing of the particular amplifier 133, 134, or 135 which was associated with that particular pick-off head segment. Power is supplied to the several amplifiers at the terminals indicated at 136, 137, 138, 139, 140, and 141. The output of the amplifiers 133, 134, and 135 is preferably in the form of a D. C. voltage applied to the associated solenoids 142, 143, or 144. These solenoids, in turn, serve to control the solenoid-operated valves 63, 145, and 146 which determine the action of the spray guns. In order to provide a desirable degree of "over spray" such that the spray gun will continue its operation for a small period of time after the termination of the energizing signal, it is preferable to provide condensers 147, 148, and 149 which serve to maintain the closure of the solenoids 142, 143, and 144 with respect to the application of voltage from the respective amplifiers. The adjustment of the position of the pick-off through the operation of the screw 132 can establish the necessary moment of the beginning of the spraying operation, and the operation of the condensers can control the moment of the cut-off such that a continuous spray pattern is achieved as the spray guns move across a continuous piece of leather, rather than having a series of intermittent spots which would result if the spray guns were to exactly follow the impulses of the detector members.

After the completion of the cycle which includes the recording at the proper station, the movement of the tape from the point of recording along the tape to the pick-off, the continuous tape passes an erasing station indicated at 150 where the tape is cleared of all impressed signals in preparation for a succeeding entry into the recording head. This cycle of operation is continuous during the functioning of the machine.

Figure 7:
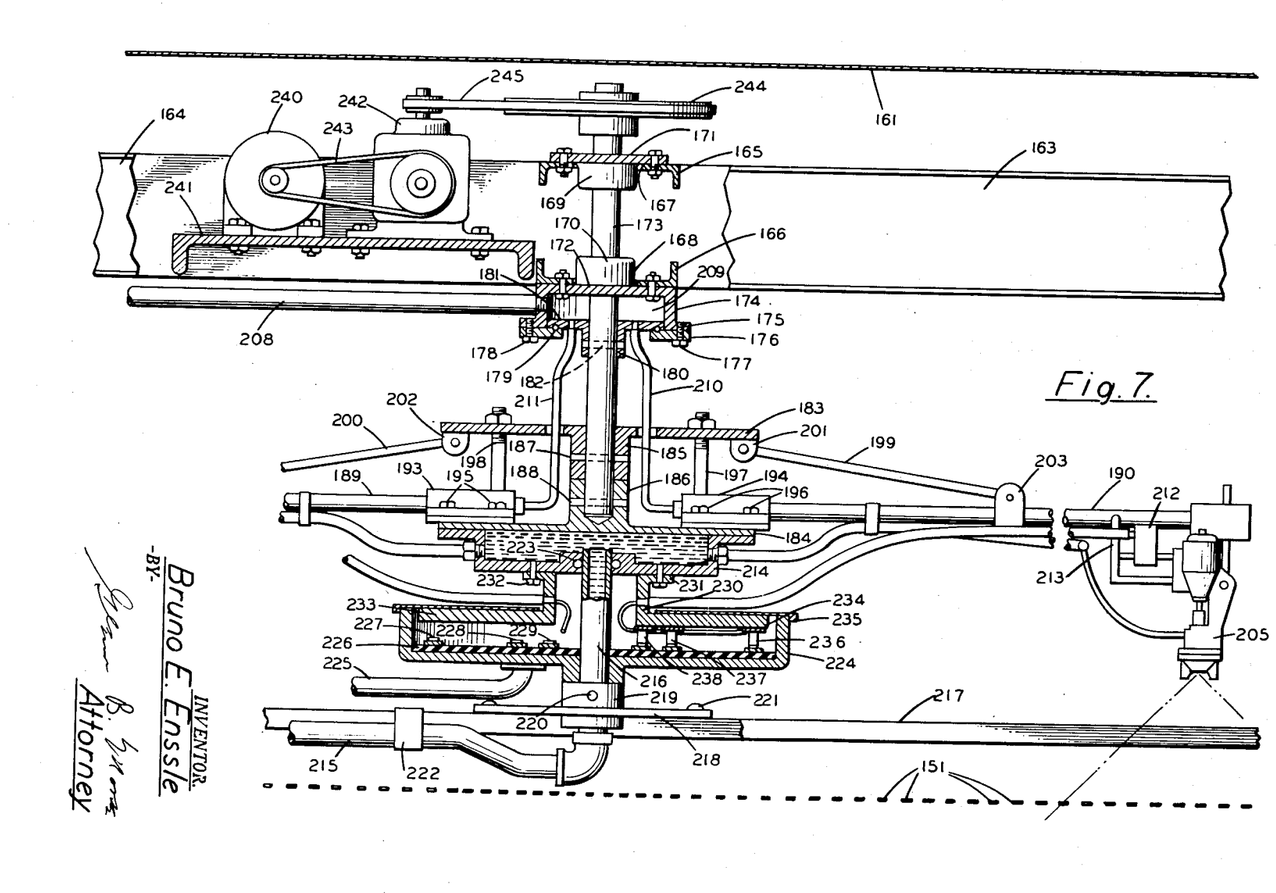
Figure 7 is a section taken on an enlarged scale on the plane 7—7 of Figure 6.

Referring particularly to Figures 6 and 7, a modified form of the invention is illustrated in which the principles of the invention are applied to a rotary spraying machine. A conveyor system including a series of spaced parallel bands 151 is positioned by a roller 152, and by a similar roller (not shown) at the opposite end of the conveyor. The rollers, and the usual equipment associated with such a conveyor, are mounted on a frame generally indicated at 153. A power unit 154 supplies torque to operate the conveyor through the transmission system including the pulleys or sprockets 155, 156, 157, and 158, and also including the belts or chains 159 and 160. The idler assembly including the sprockets 156 and 157 is mounted on a shaft, the axis of which is fixed with respect to the frame 153.

A spray booth 161 is positioned astride the path of movement of the bands 151, and provides a housing for the rotary spray unit generally indicated at 162. A pair of transverse beams 163 and 164 are mounted on columns 165 (only one of these being shown), and provides for the support of the rotary mechanism. The connecting beams 165 and 166 (refer to Figure 7) extend between the beams 163 and 164, and are securely connected thereto, as by welding. The connecting beams are provided with aligned central openings 167 and 168 for receiving portions of the bearings 169 and 170, respectively. The mounting flanges 171 and 172 of the bearings are bolted securely to the beams 165 and 166. The aligned bearings 169 and 170 provide for the support of the vertical shaft 173.

The mounting flange 172 of the bearing 170 is provided with a cylindrical lower extension 174 terminating in a flange 175 to which the cover plate 176 is secured by the bolts indicated at 177 and 178 in Figure 7. The cover plate 176 provides support for a bearing assembly generally indicated at 179, which transfers the weight of the rotary sprayer assembly from the collar 180 through the flange 181 of the collar. A pin 182 secures the position of the collar 180 on the shaft 173.

The plates 183 and 184 having the hubs 185 and 186, respectively, are also secured to the shaft 173 by pins 187 and 188, respectively. The tubular arms 189, 190, 191, and 192 are secured with respect to the plate 184 by clamping collars as indicated at 193 and 194 in Figure 7, the collars being anchored in position through the use of bolts as indicated at 195 and 196. Vertical posts 197 and 198 extend between the plates 183 and 184, and serve to maintain the alignment of the plates 183 and 184 against the action of the diagonal rods 199 and 200. These rods extend between brackets as indicated at 201 and 202 on the plate 183, and brackets as indicated at 203 on the radial arms. Compressed air is delivered to the spray gun units 204, 205, 206, and 207 by means of the supply conduit 208 via the distribution chamber 209, and conduits indicated at 210 and 211 leading from suitable apertures in the flange 181 to a connection with the tubular radial arms which support the spray guns. A solenoid-operated valve as indicated at 212 in Figure 7 controls the off-on relationship of each of the spraying units. A short conduit 213 taps into the tubular radial arm 190, and delivers compressed air to the valve 212 for controlled admission to the spray guns. Each of the spray guns is connected in a similar manner.

In addition to the delivery of compressed air to the spray guns, it is also necessary to provide the continuous supply of spray material. For this purpose, a housing 214 is secured to the plate 184 by convenient fastenings (not shown in Figure 7). The housing serves the function of a distribution chamber for liquid admitted through the pipe 215 and the vertical extension 216. The pipe 215 and the vertical extension 216 are fixed with respect to the framework of the conveyor, and do not rotate. A lower auxiliary beam system 217 maintains the position of the pipe and the vertical extension against rotating with the spray gun unit. For this purpose, the supporting plate 218 having a central boss 219 receives the vertical extension 216, and is fixed with respect thereto by the set screw 220. Suitable fastenings as indicated at 221 secure the plate 218 to the beam 117; and, if desired, clamps as shown at 222 may secure the pipe 215 in position against vibration or other undesirable displacement. Since the housing 214 rotates with respect to the vertical pipe extension 216, a rotary seal is provided at 223.

A rotary electrical distributor is also necessary in the machine in order to maintain the electrical circuits between the portions of the device which are fixed with respect to the frame, and those which rotate with the spray guns. A fixed housing 224 is mounted on the pipe extension 216, and receives an electrical conduit 225 which contains the wires leading from the fixed portion of the machine which form the part of circuits to the moving spray-gun control system. A plate of insulation material 226 is mounted within the housing 224, and provides support for the row of contacts 227, and the rings 228 and 229. An annular member having a sleeve portion 230 terminating at its upper end in a flange 231 is secured to the fluid-distribution chamber 214, by fastenings as indicated at 232, and therefore rotates with the shaft 173. The member 230 terminates at its lower extremity in the plate 233 which serves as a cover for the electrical distributor, sufficient clearance being provided at 234 for free rotation to take place between these members without interference. A protective cap 235 is provided which prevents the ingress of foreign material into the interior of a distributor. The plate 233 provides support for the contact brushes 236, 237, and 238. A set of the contact arms 236, 237, and 238 is provided corresponding to each of the radial arms supporting the spray guns.

The driving of the rotative parts of the assembly thus described is provided for with power from the motor 240 mounted upon a bracket 241 secured to the beams 163 and 164. The speed reducer 242 is driven by the motor through the belt or chain 243, the speed reducer also being mounted on the bracket 241. The output of the speed reducer is communicated to the central pulley or sprocket 244 by the belt or chain 245, the sprocket being fixed with respect to the shaft 173. Operation of the motor 140 at a relatively constant velocity establishes a predetermined velocity ratio of the spray guns around their circular path with respect to the linear movement of the conveyor.

It is ordinarily preferable to provide a path of movement of the spray guns at such a radius as will carry the guns beyond the outer edges of the conveyor established by the band 151. The path of movement of the spray guns may therefore be considered as formed of two separate arcs. Two separate groups of sensing elements (each of the construction described in connection with Figure 9) is therefore mounted in an arcuate configuration parallel to the arcuate paths of movement of the spray guns during the period in which they are over the conveyor. It would be possible to arrange the groups 246 and 247 on a common center; but to conserve space, they may be displaced and brought more closely together as shown in Figure 6. In connection with the displacement of the centers of the groups 246 and 247, it should be noted that a greater length of time is required for a given point on a piece of leather detected by a member of the 247 group to pass downward to the point where it would receive spray than is the case of a point on the same piece of leather detected by the group 246.

Figure 8:
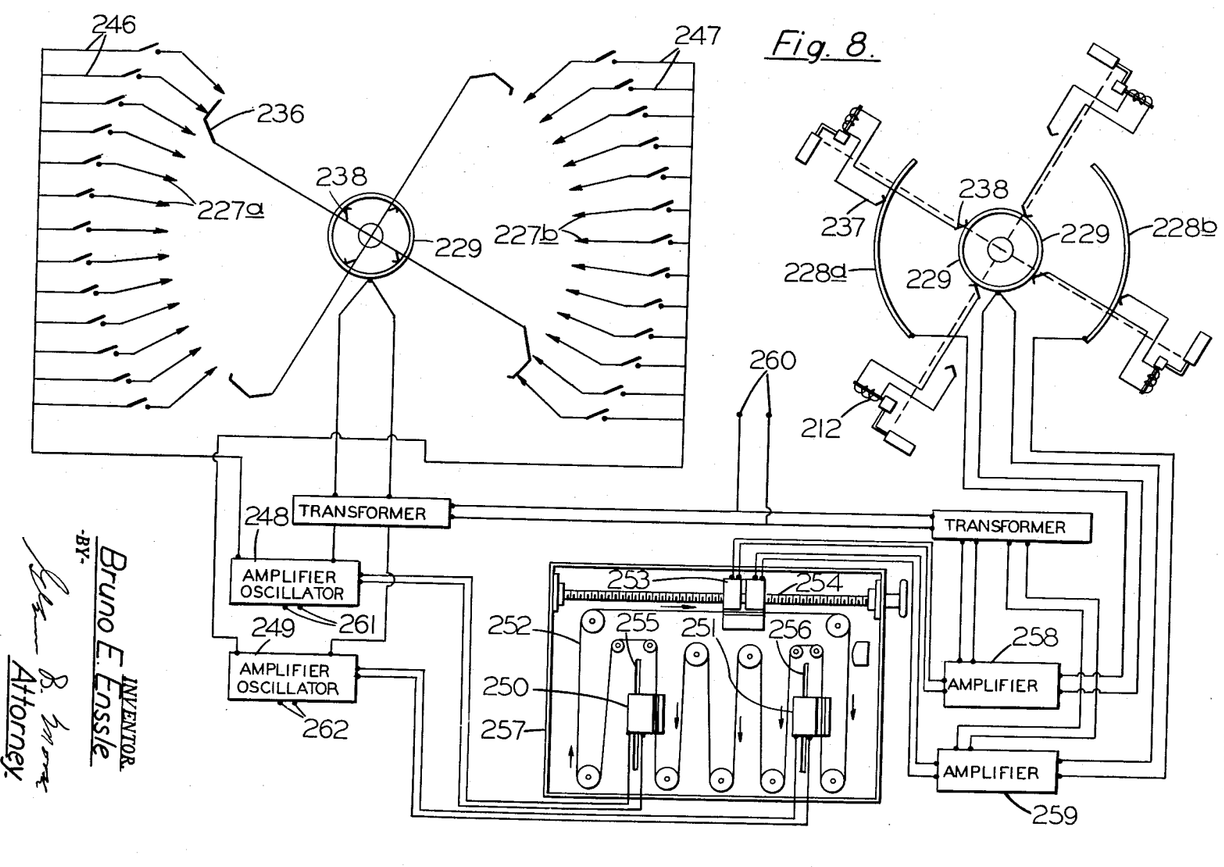
Figure 8 is a schematic electrical diagram illustrating the relationship of the components of the modification illustrated in Figures 6 and 7.

The relationship of the detecting, recording, and control system of the rotary spray unit is illustrated schematically in Figure 8. When the brush 236 establishes contact corresponding to a particular detector of the group 246 in which the mercury switch is closed, a circuit is established which includes the brush 238, the continuous ring 229, and the oscillator-amplifier 248. Similarly, the establishment of a contact corresponding to a detector of the 247 group which was in closed position at that moment, would establish a closed circuit which would include the oscillator-amplifier 249. The output on the amplifiers 248 and 249 are respectively delivered to the recording heads 250 and 251. Each of these recording heads establishes a particular path of recorded signals along the tape 252 positioned by suitable rollers as discussed in connection with the previous modification. After traversing a predetermined length of tape, the signals recorded thereon are received by the play-back unit 253. This unit, as in the previous modification, is adjustably mounted for movement with respect to the path of the tape through the operation of a screw 254. It is also preferable to mount the recording heads 250 and 251 for adjustment through the provision of slots 255 and 256 in the base plate of the housing 257 provided for the mechanism.

When a signal on the tape arrives at the play-back unit, which is actually a groupt of two play-back heads corresponding to the two recorded paths on the tape, the arrival of the signal energizes either the amplifier 258 or the amplifier 259 depending upon which path is involved. The output of the amplifier 258 is delivered to the ring segment 228a, and that of the amplifier 259 to the ring segment 228b. During the path of movement of the spray gun over the left-hand portion of its travel as seen in Figure 6, the brush 237 will be in contact with the ring segment 228a. If, during this period of traverse, a signal is received from the amplifier 258, the gun will be "fired." The voltage utilized to operate the solenoid valves 212 is of sufficiently different characteristics so that a common center ring 229 may be used for both the gun-control circuits and the recording circuit which includes the outer brushes 236. It may be noted that the length of the arc of the segment 228a (and also that of 228b) corresponds approximately to the period in which the spray guns are over the conveyor. Ideally, the proportions of the machine should be adjusted so that the period during which the guns are over the conveyor corresponds to an arc of slightly less than 90° of the segment 228a when four spray guns are utilized. Under this arrangement, only one gun can be "fired" by a signal from the associated amplifier. Otherwise, a spurious discharge would occur which did not correspond to a signal established by the recording system. Only one of the two guns which would be instantaneously fired would correspond to the recorded image on the tape.

Power may be supplied to the circuit shown in Figure 8 through the main terminals 260, and to the oscillator-amplifiers 248 and 249 at the terminals 261 and 262, respectively. A power supply of the same general characteristics may also be applied to the main terminals 263 of the Figure 5 modification.

The particular embodiments of the present invention which have been illustrated and described herein are for illustrative purposes only and are not to be considered as a limitation upon the scope of the appended claims. In these claims, it is my intent to claim the entire invention disclosed herein, except as I am limited by the prior art.

I claim:

1. A machine for spraying articles of irregular outline, said machine comprising: conveyor means; a plurality of detector members disposed in an arc across said conveyor for sensing the presence of portions of articles moving along said conveyor; switch means controlled by each of said detector members, respectively; spray gun means; carrier means for said spray-gun means mounted for rotary movement on a radius equal to the radius of said arc, said spray-gun carrier means including a radius arm mounted for rotation with respect to said conveyor means on an axis perpendicular to the plane of the conveying portion of said conveyor means, said axis being disposed subsequently to the center of said arc along said conveyor means; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording a signal on a strip as a function of the presence of a completed circuit through said contact arm, contact means, and switch means; drive means for moving said strip in predetermined relationship with said conveyor means; pick-off means disposed at a predetermined position along said strip at a distance from the point of recording which is related to the distance from said detector members to said spray gun means along along said conveyor means, allowance being made for the relation of the velocity of said strip to that of said conveyor means; spray gun control means operative to energize said spray guns in response to signals on said strip received by said pick-off means, said spray gun control means including ring segment means extending over an arc corresponding to the sector traversed by said radius arm during the passage of said spray gun means over said conveyor means, said spray-gun control means also including brush means fixed with respect to said radius arm and disposed to engage said ring segment means; and drive means for operating said conveyor means and said spray-gun carrier-means at a predetermined velocity relationship.

2. A machine for spraying articles of irregular outline, said machine comprising: conveyor means; a plurality of detector members disposed in an arc across said conveyor for sensing the presence of portions of articles moving along said conveyor; mercury switch means controlled by each of said detector members, respectively; spray gun means; carrier means for said spray-gun means mounted for rotary movement on a radius equal to the radius of said arc, said spray-gun carrier means including a radius arm mounted for rotation with respect to said conveyor means on an axis perpendicular to the plane of the conveying portion of said conveyor means, said axis being disposed subsequently to the center of said arc along said conveyor means; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording an eraseable signal on an endless strip as a function of the presence of a completed circuit through said contact arm, contact means, and switch means; drive means for moving said strip in predetermined relationship with said conveyor means; pick-off means disposed at a predetermined adjustable position along said strip at a distance from the point of recording which is related to the distance from said detector members to said spray gun means along said conveyor means, allowance being made for the relation of the velocity of said strip to that of said conveyor means; spray gun control means operative to energize said spray guns in response to signals on said strip received by said pick-off means; and drive means for operating said conveyor means and said spray-gun carrier-means at a predetermined velocity relationship.

3. A machine for spraying articles of irregular outline, said machine comprising: conveyor means; a plurality of detector members disposed in a line across said conveyor for sensing the presence of portions of articles moving along said conveyor; mercury switch means controlled by each of said detector members, respectively; spray gun means; carrier means for said spray-gun means mounted for movement parallel to said line of detector members with respect to said conveyor means at a position along said conveyor means subsequent to the position of said detector members, said spray-gun carrier means including a carriage mounted for transverse movement across and opposite said conveyor means; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording an eraseable signal on an endless strip as a function of the presence of a completed circuit through said contact arm, contact means, and switch means; drive means for moving said strip in predetermined relationship with said conveyor means; pick-off means disposed at a predetermined adjustable position along said strip at a distance from the point of recording which is related to the distance from said detector members to said spray gun means along said conveyor means, allowance being made for the relation of the velocity of said strip to that of said conveyor means; spray gun control means operative to energize said spray guns in response to signals on said strip received by said pick-off means; and drive means for operating said conveyor means and said spray-gun carrier-means at a predetermined velocity relationship.

4. A machine for spraying articles of irregular outline, said machine comprising: conveyor means; a plurality of detector members disposed in an arc across said conveyor for sensing the presence of portions of articles moving along said conveyor; mercury switch means controlled by each of said detector members, respectively; spray gun means; carrier means for said spray-gun means mounted for rotary movement on a radius equal to the radius of said arc, said spray-gun carrier means including a radius arm mounted for rotation with respect to said conveyor means on an axis perpendicular to the plane of the conveying portion of said conveyor means, said axis being disposed subsequently to the center of said arc along said conveyor means; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording an eraseable signal on an endless strip as a function of the presence of a completed circuit through said contact arm, contact means, and switch means; drive means for moving said strip in predetermined relationship with said conveyor means; pick-off means disposed at a predetermined position along said strip at a distance from the point of recording which is related to the distance from said detector members to said spray gun means along said conveyor means, allowance being made for the relation of the velocity of said strip to that of said conveyor means; spray gun control means operative to energize said spray guns in response to signals on said strip received by said pick-off means; and drive means for operating said conveyor means and said spray-gun carrier-means at a predetermined velocity relationship.

5. A machine for spraying articles of irregular outline, said machine comprising: conveyor means; a plurality of detector members disposed in a line across said conveyor for sensing the presence of portions of articles moving along said conveyor; mercury switch means controlled by each of said detector members, respectively; spray gun means; carrier means for said spray-gun means mounted for movement parallel to said line of detector members with respect to said conveyor means at a position along said conveyor means subsequent to the position of said detector members, said spray-gun carrier means including a carriage mounted for transverse movement across and opposite said conveyor means; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording an eraseable signal on an endless strip as a function of the presence of a completed circuit through said contact arm, contact means, and switch means; drive means for moving said strip in predetermined relationship with said conveyor means; pick-off means disposed at a predetermined position along said strip at a distance from the point of recording which is related to the distance from said detector members to said spray gun means along said conveyor means, allowance being made for the relation of the velocity of said strip to that of said conveyor means; spray gun control means operative to energize said spray guns in response to signals on said strip received by said pick-off means; and drive means for operating said conveyor means and said spray-gun carrier-means at a predetermined velocity relationship.

6. A machine for spraying articles of irregular outline, said machine comprising: conveyor means; a plurality of detector members disposed in a group across said conveyor for sensing the presence of portions of articles moving along said conveyor; switch means controlled by each of said detector members, respectively; spray gun means; carrier means for said spray-gun means mounted for movement parallel to said line of detector members with respect to said conveyor means at a position along said conveyor means subsequent to the position of said detector members; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording a signal on a strip as a function of the presence of a completed circuit through said contact arm, contact means, and switch means; drive means for moving said strip in predetermined relationship with said conveyor means; pick-off means; mounting means for disposing said pick-off means at a predetermined adjustable position along said strip at a distance from the point of recording which is related to the distance from said detector members to said spray gun means along said conveyor means, allowance being made for the relation of the velocity of said strip to that of said conveyor means, said mounting means including a control member operable from a position in view of said spray gun means; spray gun control means operative to energize said spray guns in response to signals on said strip received by said pick-off means; and drive means for operating said conveyor means and said spray-gun carrier-means at a predetermined velocity relationship.

7. A machine for spraying articles of irregular outline, said machine comprising: conveyor means; a plurality of detector members disposed in a group across said conveyor for sensing the presence of portions of articles moving along said conveyor; switch means controlled by each of said detector members, respectively; spray gun means; carrier means for said spray-gun means mounted for movement parallel to said group of detector members with respect to said conveyor means at a position along said conveyor means subsequent to the position of said detector members; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording a signal on a strip as a function of the presence of a completed circuit through said contact arm, contact means, and switch means; drive means for moving said strip in predetermined relationship with said conveyor means; pick-off means disposed at a predetermined adjustable position along said strip at a distance from the point of recording which is related to the distance from said detector members to said spray gun means along said conveyor means, allowance being made for the relation of the velocity of said strip to that of said conveyor means; spray gun control means operative to energize said spray guns in response to signals on said strip received by said pick-off means; and drive means for operating said conveyor means and said spray-gun carrier-means at a predetermined velocity relationship.

8. A machine for spraying articles of irregular outline, said machine comprising: conveyor means; a plurality of detector members disposed in a group across said conveyor for sensing the presence of portions of articles moving along said conveyor; switch means controlled by each of said detector members, respectively; spray gun means; carrier means for said spray-gun means mounted for movement parallel to said group of detector members at a position along said conveyor means subsequent to the position of said detector members; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording a signal on a strip as a function of the presence of a completed circuit through said contact arm, contact means, and switch means; drive means for moving said strip in predetermined relationship with said conveyor means; pick-off means disposed at a predetermined position along said strip at a distance from the point of recording which is related to the distance from said detector members to said spray gun means along said conveyor means, allowance being made for the relation of the velocity of said strip to that of said conveyor means, the position of at least one of said pick-off or recording means being adjustable along the path of said strip; spray gun control means operative to energize said spray guns in response to signals on said strip received by said pick-off means; and drive means for operating said conveyor means and said spray-gun carrier-means at a predetermined velocity relationship.

9. A machine for spraying articles of irregular outline, said machine comprising: conveyor means; a plurality of detector members disposed in a group across said conveyor for sensing the presence of portions of articles moving along said conveyor; mercury switch means controlled by each of said detector members, respectively; spray gun means; carrier means for said spray-gun means mounted for movement parallel to said group of detector members at a position along said conveyor means subsequent to the position of said detector members; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording a signal on a strip as a function of the presence of a completed circuit through said contact arm, contact means, and switch means; drive means for moving said strip in predetermined relationship with said conveyor means; pick-off means disposed at a predetermined position along said strip at a distance from the point of recording which is related to the distance from said detector members to said spray gun means along said conveyor means, allowance being made for the relation of the velocity of said strip to that of said conveyor means; spray gun control means operative to energize said spray guns in response to signals on said strip received by said pick-off means; and drive means for operating said conveyor means and said spray-gun carrier-means at a predetermined velocity relationship.

10. A machine for spraying articles of irregular outline, said machine comprising: conveyor means; a plurality of detector members disposed in a group across said conveyor for sensing the presence of portions of articles moving along said conveyor; switch means controlled by each of said detector members, respectively; spray gun means; carrier means for said spray-gun means mounted for movement parallel to said group of detector members at a position along said conveyor means subsequent to the position of said detector members; a plurality of contact means, each associated respectively and in sequence with one of said switch means; a contact arm mounted for movement along a path established for said contact arm to engage each of said contact means in sequence; driving means for moving said contact arm as a function of the movement of said carrier means; recording means for recording a signal on a strip as a function of the presence of a completed circuit through said contact arm, contact means, and switch means; drive means for moving said strip in predetermined relationship with said conveyor means; pick-off means disposed at a predetermined position along said strip at a distance from the point of recording which is related to the distance from said detector members to said spray gun means along said conveyor means, allowance being made for the relation of the velocity of said strip to that of said conveyor means; spray gun control means operative to energize said spray guns in response to signals on said strip received by said pick-off means; and drive means for operating said conveyor means and said spray-gun carrier-means at a predetermined velocity relationship.

References Cited in the file of this patent

UNITED STATES PATENTS

| | | |
|---|---|---|
| 441,991 | Travis | Dec. 2, 1890 |
| 1,932,215 | Johnson et al. | Oct. 24, 1933 |
| 2,213,108 | Pollard | Aug. 27, 1940 |
| 2,426,838 | Miller | Sept. 2, 1947 |
| 2,565,655 | Giraudo | Aug. 28, 1951 |
| 2,573,143 | Jacob | Oct. 30, 1951 |